United States Patent
Krause et al.

(10) Patent No.: US 6,560,811 B1
(45) Date of Patent: May 13, 2003

(54) COMPACT APPARATUS FOR CLEANING OPTICAL FIBER ENDFACES

(75) Inventors: Dennis L Krause, Atkinson, NH (US); Elaine Fontes Parnagian, Lowell, MA (US)

(73) Assignee: Lucent Technologies Inc., Murray Hill, NJ (US)

( * ) Notice: Subject to any disclaimer, the term of this patent is extended or adjusted under 35 U.S.C. 154(b) by 305 days.

(21) Appl. No.: 09/638,330

(22) Filed: Aug. 14, 2000

(51) Int. Cl.[7] ................................................. B43L 21/00
(52) U.S. Cl. ........................ 15/210.1; 15/209.1; 15/231; 15/104.93; 15/104.94; 15/118
(58) Field of Search ........................... 15/210.1, 104.93, 15/104.94, 118, 209.1, 231, 244.3, 218, 218.1, 220.4, 215; 401/25, 26, 35, 268, 283

(56) References Cited

U.S. PATENT DOCUMENTS 5,220,703 A * 6/1993 Kanayama et al. ........ 15/210.1
6,199,240 B1 * 3/2001 You ............................ 15/121

FOREIGN PATENT DOCUMENTS

EP         1048963 A1 * 11/2000 ............ G02B/6/38

* cited by examiner

Primary Examiner—Robert J. Warden, Sr.
Assistant Examiner—S Balsis

(57) ABSTRACT

A compact optical fiber cleaning apparatus includes a base plate and a retaining plate having a plurality of apertures. The base plate is configured to hold one or more resilient absorbers situated under the retaining plate. In operation, a wiper, such as a piece of lint-free cloth, is placed over the absorber and the retainer is closed. When closed, the plurality of apertures within the retainer allow wiper material to be forced through the apertures by the resilient absorber material. Each section of exposed wiper may be employed for a different cleaning purpose. For example, a solvent may be applied to one exposed section of the wiper, or to the underlying absorber material, with another exposed section of the wiper left dry. A technician may then clean an optical fiber endface, by first wiping the endface on the "wet" section of wiper material, then wiping the endface on the "dry" section of wiper material.

19 Claims, 4 Drawing Sheets

COMPACT APPARATUS FOR CLEANING OPTICAL FIBER ENDFACES

FIELD OF THE INVENTION

The invention relates to the cleaning of optical fibers and, in particular, to the safe application of solvents for removal of contaminants from the endfaces of optical fibers.

BACKGROUND OF THE INVENTION

Optical transmission of signals is not new. Mirrors have been used for centuries to reflect light in signaling patterns. Lanterns hung in the bell tower of the Old North Church in Boston's North End were employed by Paul Revere to indicate the route used by the British in their advance on Concord. Alexander Graham Bell transmitted a telephone signal using sunlight as a carrier more than one hundred years ago. However, using optical signals to transmit high-speed telecommunications has only been practical for the past few decades and one of the innovations that made such transmissions practical is the optical fiber.

Coupled with a "single frequency" laser a single mode fiber may be capable of reliably supporting data rates in excess of Terabits/sec. Great pains must be taken to insure reliable operation at such high data rates. A great deal of information could be lost in a short period of time at such high transmission rates. Various optical components within a telecommunication system are linked through the use of optical connectors and the interface at each of these connections poses the danger of signal loss. That is, contaminants in the form of organic films or solid contaminants may be inadvertently introduced to the endfaces of optical connectors and these contaminants may reflect or absorb optical signals intended for transmission through the endface. Optical signal levels may be significantly reduced even by contaminants of a microscopic scale and the diminished signals could cause significantly increased bit error rates for optical transmissions that pass through a contaminated connector. Consequently, fiber endfaces are typically cleaned to exacting standards before they are shipped to an installation site. This cleaning process typically requires a technician to apply a solvent to a connector endface, and wipe the endface with a nonabrasive material, such as a soft cloth sometimes referred to as a "wipe". Direct contact with the solvent may pose a health hazard; therefore, technicians typically don gloves to avoid direct contact with the solvent materials. Unfortunately, the gloves sometimes prove awkward and reduce the efficiency of technicians engaged in the cleaning process. Additionally, there is some indication that some technicians may develop an allergy to glove materials, such as latex.

It would therefore be highly desirable to provide an apparatus that enables the fast, efficient, and safe cleaning of optical fiber endfaces.

SUMMARY

A compact optical fiber cleaning apparatus in accordance with the principles of the present invention includes a base plate and a retainer having a plurality of apertures. The base plate is configured to hold one or more resilient absorbers situated under the retaining plate. In operation, a wiper, such as a piece of lint-free cloth, is placed over the absorber and the retainer is closed. When closed, the plurality of apertures within the retainer allow wiper material to be forced through the apertures by the resilient absorber material. Each section of exposed wiper may be employed for a different cleaning purpose. For example, a solvent may be applied to one exposed section of the wiper, or to the underlying absorber material, with another exposed section of the wiper left dry. A technician may then clean an optical fiber endface, by first wiping the endface on the "wet" section of wiper material, then wiping the endface on the "dry" section of wiper material. The wiper and absorber materials may be replaced after one or more cleanings.

In an illustrative embodiment, a compact cleaner includes a base plate, a retaining plate, and a protective cover, each of which may be manufactured from an electrostatic dissipated (ESD) type plastic material, such as Pomalux® SD The base plate retains two rectangular absorbers in recessed cavities that are adjacent to one another. The absorbers may be polyurethane ESD foam pads, for example. A lint-free cleaning fabric, such as Luminex®, is positioned directly over the two absorbers. The retaining plate, which is hinged to the base plate and, in this illustrative embodiment, includes two rectangular openings matched to the absorbers, forces the cleaning fabric into contact with the absorbers. Additionally, the portions of the absorbers that protrude through the openings in the retaining plate stretch the cleaning fabric to expose two taught, resilient, cleaning surfaces. The retaining plate is held in the closed position by a tension clip. The cover plate, which is also hinged to the base plate, may be closed over the retainer/base plate combination in order to protect the exposed "pillowed" cleaning fabric from environmental contamination. All components of the compact cleaner in this illustrative embodiment are composed of electrostatic discharge-free (ESD-free) materials.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

Figure 1:
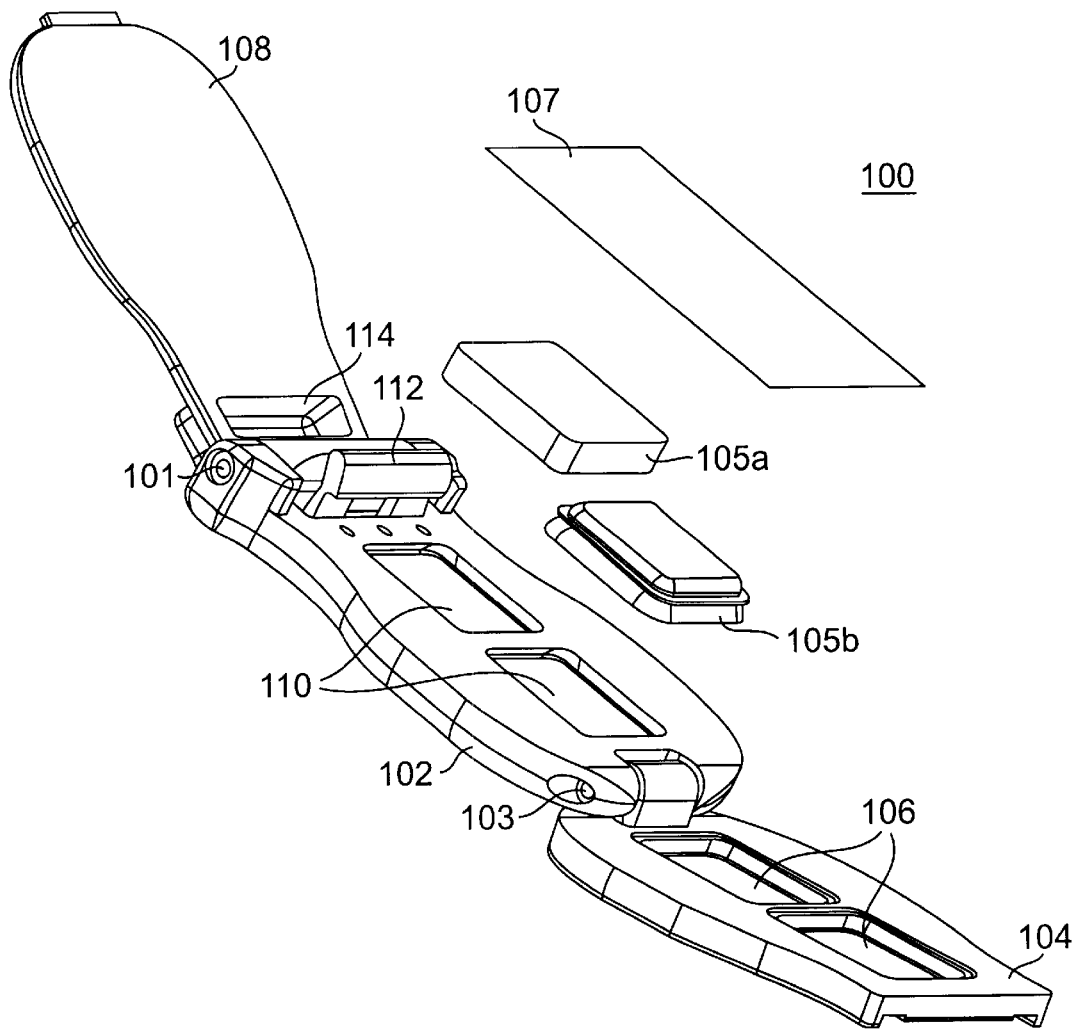
FIG. 1 is a perspective view of a compact optical fiber cleaning system in accordance with the principles of the present invention.

The perspective view of FIG. 1 illustrates an embodiment in accordance with the principles of the present invention of a compact optical fiber cleaning apparatus 100. The compact cleaner 100 includes a base plate 102 and a retaining plate 104 having a plurality of apertures 106. The retaining plate 104 is attached to the base plate 102 via a hinge assembly 103. The base plate 102 is configured to hold one or more resilient absorbers 105 (105a uncompressed and 105b as it would appear through the retainer aperture 106) situated under the retaining plate 104. In operation, a wiper 107, such as a piece of lint-free cloth, is placed over the absorber 105 and the retaining plate 104 is closed. When closed, the plurality of apertures 106 within the retainer 104 allow wiper material to be forced through the apertures by the resilient absorber material. Each section of exposed wiper 107 may be employed for a different cleaning purpose. For example, a solvent may be applied to one exposed section of the wiper 107, or to the underlying absorber 105 material, with another exposed section of the wiper 107 left dry. A technician may then clean an optical fiber endface, by first wiping the endface on the "wet" section of wiper 107 material, then wiping the endface on the "dry" section of wiper 107 material. The wiper 107 and absorber 105 materials may be replaced after one or more cleanings.

The base plate 102, retaining plate 104, and a protective cover 108 (attached to the base plate 102 through a hinge assembly 101), may be manufactured from an electrostatic dissipated (ESD) type plastic material, such as Pomalux® SD (available from Westlake Plastics, Lenni, Pa.). The base plate 102 retains two rectangular absorbers 105 in recessed cavities 110, or wells, that are adjacent to one another. The absorbers 105 may be composed of an elastomeric, solvent-compatible material, such as an ester-based polyester or polyurethane in the form of polyurethane ESD foam pads, for example. The recessed cavities 110 may be undercut to hold the absorbers 105 in place whenever the retaining plate 104 is opened, to change a wiper 107, for example. Additionally, the apertures 106 may be tapered to grip and tension a wiper 107 whenever the retaining plate 104 is shut. The interior sides of the retaining plate walls are chamfered 109 to accommodate the expansion of the resilient materials. A lint-free cleaning fabric is employed as a wiper 107 and is positioned directly over the two absorbers 105. The wiper 107 is preferably a lint-free, non-abrasive fabric. In an illustrative embodiment the wipe is composed of an ultra-fine weave that includes on the order of 220,000 micro-fibers per square inch. Luminex, which is available from Toray Marketing Inc. of New York, N.Y. is an example of such a material. The apertures 106 and recessed cavities 110 are aligned to ensure that absorbers 105 and wiper 107 are not pinched, or bunched, and that they "pillow" properly when the retaining plate 104 is closed.

The retaining plate 104, which is hinged to the base plate 102 and, in this illustrative embodiment, includes two rectangular openings 106 matched to the absorbers 105, forces the cleaning fabric into contact with the absorbers 105. The absorbers 105 are sized to extend into the apertures 106 when the retaining plate 104 is closed. The portions of the absorbers 105 that protrude through the openings in the retaining plate 104 stretch the material of the wiper to expose two taught, resilient, cleaning surfaces. The retainer 104 plate is held in the closed position by a latch 112, such as a tension clip. The cover plate 108, may be closed over the retaining plate 104/base plate 102 combination in order to protect the exposed "pillowed" cleaning fabric from environmental contamination. In this illustrative embodiment, the latch 112 extends substantially above the retaining plate 104 to provide sufficient leverage for a technician to operate the latch 112 with relative ease. In order to accommodate the extension of the latch 112 without adding significantly to the overall bulk of the compact cleaner 100, a recess 114 in the cover plate 108 admits the latch 112 when the cover plate 108 is closed over the retaining plate 104.

Figure 2:
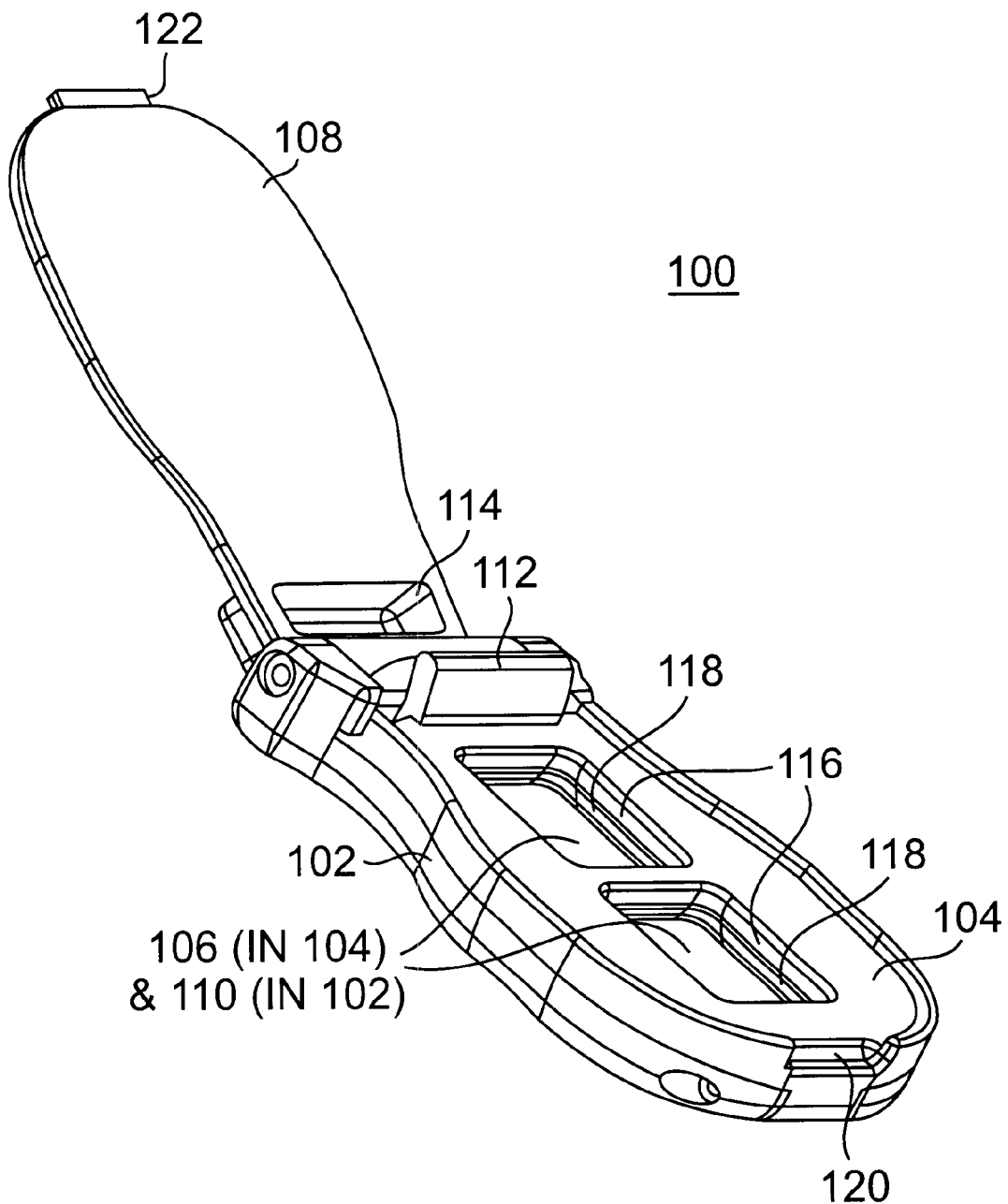
FIG. 2 is a perspective view of the compact optical fiber cleaning system of FIG. 1, with a retaining plate closed.

The perspective view of FIG. 2 illustrates the compact cleaner 100 with the retaining plate 104 closed and cover plate 108 open, as they would be during a cleaning operation. With absorber 105 (not shown) and wiper 107 (not shown) in place, the closed retaining plate 108 would force the wiper 107 over the absorber 105 to expose cleaning surfaces within the apertures 106. As is more evident in this view, the apertures 106 include tapered side walls 116 configured to grip and tension the fabric of the wiper 107. Also more evident in this view is the undercut 118 in the walls of the recessed cavities 110, configured to hold the absorbers 105 in place whenever the retaining plate 104 is open. A recess 120 in the retaining plate 104 permits ready access to a tab 122 on the cover plate 108 when the cover plate is closed. The tab 122 may be used by a technician to open the cover plate 108 to gain access to the wiper 107 retained under the retaining plate 104 for cleaning an optical fiber endface.

Figure 3:
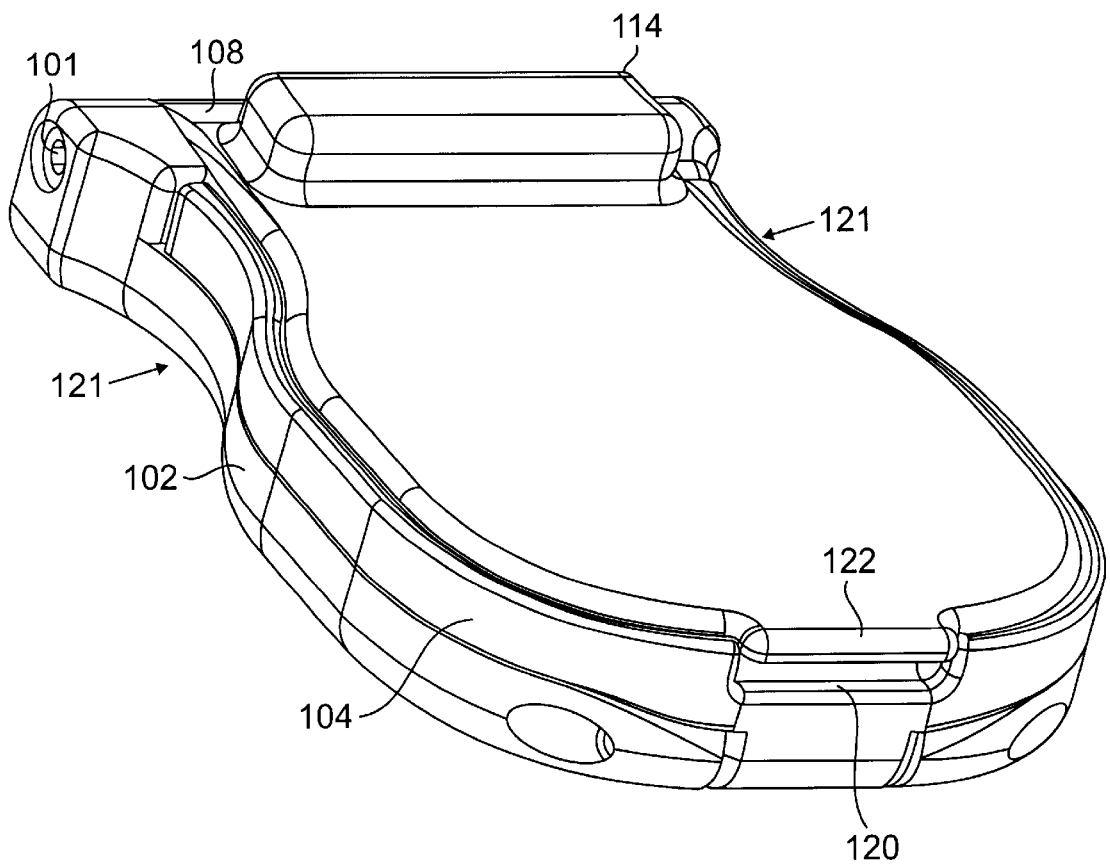
FIG. 3 is a perspective view of the compact optical fiber cleaning system of FIGS. 1 and 2, with the retaining plate closed and the cover plate closed over the retaining plate.
Figure 4:
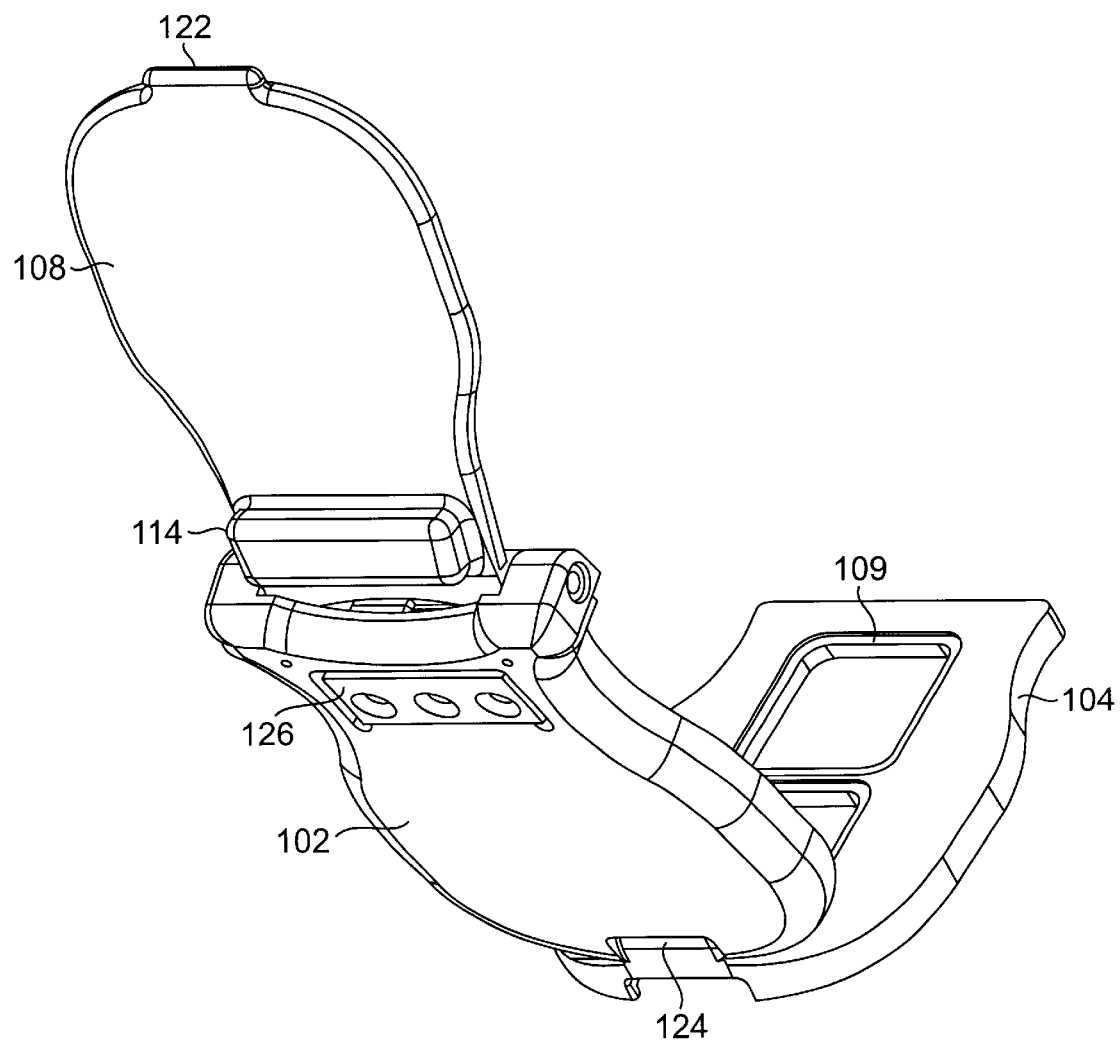
FIG. 4 is a perspective view of an optical fiber cleaning system in accordance with the principles of the present invention, with the retaining plate and cover plate closed, as in FIG. 3, but from a different perspective.

Turning now to FIG. 3, a compact cleaner 100 in accordance with the principles of the present invention is illustrated with retaining plate 104 and the cover plate 108 shut over the retaining plate 104. The recess 120 and tab 122 are more clearly illustrated in this view. With the operation of the recess 120, a technician may slip a finger under the tab 122 with relative ease in order to open the compact cleaner 100. In this illustrative embodiment, the cleaner 100 incorporates a "waist" 121, of narrower dimension between the hinged area and oblate circular area of the cleaner 100 in order to enable an operator to easily grasp the cleaner in one hand. In order to further enhance the ergonomic aspects of the cleaner 100, the base plate 102 may have an eighth inch radius formed on its perimeter. A "wavy washer", that is, a washer with a concave profile (not shown) may be employed in the hinge assembly 101 to permit the cover plate 108 to retain a position, so that a user may open the cover plate 108 to a desired position and release the plate without being required to hold the plate in position. The perspective FIG. 4 provides a view of an optical fiber cleaning system in accordance with the principles of the present invention, with the retaining plate and cover plate open. In this view, a pivot block 124 for the retaining plate 104 is visible, as is an attachment flange 126 for the latch 112.

In operation, absorbers 105 are secured within the recesses 106, using the undercuts 118, for example. A wiper 107 is placed over the absorbers 105 and the retaining plate 104 is secured shut with the latch 112. With the retaining plate 104 latched shut over the wiper 107 and absorbers 105, the absorbers 105 push the wiper 107 into the apertures 106 formed within the retaining plate 104. A technician may apply a solvent to one of the two adjacent rectangular "pillows" of wiper material protruding into the apertures 106. In an illustrative embodiment one or two drops of high purity ethyl alcohol or 99% or better electronic grade isopropyl alcohol may be applied from a control drop solvent dispensing bottle to the wiper pillow in one of the apertures 106. A technician may then place the optical fiber endface (which may be contained within a connector) in contact with the surface of the pillow containing solvent. The surfaces of the endface and the pillow should be substantially parallel. The technician may then lightly move the endface two or three times in a figure eight pattern on the pillow. Immediately thereafter, the technician may transfer the endface to the other pillow, that is, the pillow that did not receive the drops of solvent and is therefore "dry". The technician may then similarly move the endface two or three times in a figure eight pattern on the surface of the dry pillow. Between cleaning operations the cover plate 108 should be closed. A polishing film, such as a 0.05 micron grid or less mylar film, may be substituted for the wiper 107 to permit an operator to use the cleaner 100 as a polisher and to thereby remove fixed particulate materials from fiber endfaces.

The foregoing description of specific embodiments of the invention has been presented for the purposes of illustration and description. It is not intended to be exhaustive or to limit the invention to the precise forms disclosed, and many modifications and variations are possible in light of the above teachings. For example, a solvent dispenser may be incorporated in the cleaner, thus eliminating the need for a separate dispensing bottle. The embodiments were chosen and described to best explain the principles of the invention and its practical application, and to thereby enable others skilled in the art to best utilize the invention. It is intended that the scope of the invention be limited only by the claims appended hereto.

What is claimed is:

1. An optical fiber endface cleaner comprising:
    a base plate for housing one or more absorbers; and
    a retainer plate connected to the base plate and having a plurality of apertures adapted to forcing a wiper over the one or more absorbers the wipers thereby protruding through the apertures when the retainer plate is closed over the base plate.

2. The cleaner of claim 1 wherein the base plate includes one or more wells for holding the absorbers.

3. The cleaner of claim 2 wherein walls of the wells are undercut to retain the absorbers.

4. The cleaner of claim 2 wherein the wells are rectangular in shape and adjacent.

5. The cleaner of claim 2 wherein the retainer apertures are aligned with walls of the base.

6. The cleaner of claim 1 wherein the apertures include walls that are tapered to stretch and tighten the wiper.

7. The cleaner of claim 1 further comprising one or more resilient absorbers.

8. The cleaner of claim 7 wherein each of the absorbers is composed of an ester-based material.

9. The cleaner of claim 8 wherein the absorber is composed of a polyurethane foam.

10. The cleaner of claim 1 further comprising a wiper.

11. The cleaner of claim 10 wherein the wiper is composed of a lint-free, non-abrasive fabric of an ultra-fine weave that includes on the order of 220,000 micro-fibers per square inch.

12. The cleaner of claim 1 wherein the base plate and retaining plate are connected through a hinged connection.

13. The cleaner of claim 1 further comprising a cover plate connected to the base plate.

14. The cleaner of claim 13 wherein the cover plate and retaining plate are connected through hinged connections to the base plate at opposite ends of the base plate.

15. The cleaner of claim 14 further comprising a latch situated to engage the retaining plate as the plate is shut over the base plate.

16. The cleaner of claim 15 wherein the latch is a tension latch.

17. The cleaner of claim 16 wherein the latched connection between the base plate and cover plate incorporates a resistance means to retain an opened cover position.

18. The cleaner of claim 14 wherein the cover plate is substantially flat and circular in outline and includes a tab that extends beyond the general outline of the cover plate, generally parallel to the plane of the cover plate.

19. The cleaner of claim 18 wherein the outline of the cleaner includes a relatively narrow waist for gripping the substantially circular outline of the cleaner.

* * * * *